United States Patent [19]
Kraft et al.

[11] Patent Number: 4,497,880
[45] Date of Patent: Feb. 5, 1985

[54] RECOMBINATION DEVICE FOR STORAGE BATTERIES

[75] Inventors: Helmut Kraft, Liederbach; Konstantin Ledjeff, Bad Krozingen, both of Fed. Rep. of Germany

[73] Assignee: The United States of America as represented by the Department of Energy, Washington, D.C.

[21] Appl. No.: 474,386

[22] Filed: Mar. 11, 1983

[30] Foreign Application Priority Data

May 13, 1982 [DE] Fed. Rep. of Germany ....... 3218016

[51] Int. Cl.³ .............................................. H01M 2/12
[52] U.S. Cl. ....................................... 429/86; 429/78; 429/89
[58] Field of Search ..................... 429/82–89, 429/122, 121, 57, 78

[56] References Cited

U.S. PATENT DOCUMENTS

| | | | |
|---|---|---|---|
| 3,100,165 | 8/1963 | Chapman | 429/82 X |
| 3,928,078 | 12/1975 | Köthe | 429/82 X |
| 4,002,496 | 1/1977 | Nitta et al. | 429/86 X |
| 4,087,592 | 5/1978 | Okazaki et al. | 429/88 X |
| 4,098,964 | 7/1978 | Reber | 429/86 |
| 4,374,907 | 2/1983 | Chuang et al. | 429/86 X |
| 4,394,423 | 7/1983 | Ledjeff | 429/86 |
| 4,424,263 | 1/1984 | Howell et al. | 429/88 |

*Primary Examiner*—Charles F. Lefevour
*Attorney, Agent, or Firm*—Hugh W. Glenn; Robert J. Fisher

[57] ABSTRACT

A recombination device including a gas-tight enclosure connected to receive the discharge gases from a rechargeable storage battery. Catalytic material for the recombination of hydrogen and oxygen to form water is supported within the enclosure. The enclosure is sealed from the atmosphere by a liquid seal including two vertical chambers interconnected with an inverted U-shaped overflow tube. The first chamber is connected at its upper portion to the enclosure and the second chamber communicates at its upper portion with the atmosphere. If the pressure within the enclosure differs as overpressure or vacuum by more than the liquid level, the liquid is forced into one of the two chambers and the overpressure is vented or the vacuum is relieved. The recombination device also includes means for returning recombined liquid to the battery and for absorbing metal hydrides.

5 Claims, 1 Drawing Figure

RECOMBINATION DEVICE FOR STORAGE BATTERIES

CONTRACTUAL ORIGIN OF THE INVENTION

The U.S. Government has rights in this invention pursuant to Subcontract No. W-31-109-38-4438 with Varta Batterie AG under Contract No. W-31-109-ENG-38 between the U.S. Department of Energy and University of Chicago.

BACKGROUND OF THE INVENTION

The present invention relates to a recombination device for use in conjunction with a storage battery for recombining hydrogen and oxygen gases discharged from the battery. It is particularly applicable to storage batteries and recombination devices that are to be enclosed in one gas tight housing or in two communicating housings with a pressure sensitive closure sealing against excess pressure or vacuum in respect to the outside atmosphere.

The use of gas recombination devices with rechargeable storage batteries facilitates applying the topping or finishing charge to the battery. However, it has not been possible to use rechargeable storage batteries in the same way as gas-tight cells because the recombination devices are normally vented to the atmosphere. To prevent overpressure at high charging loads, the housing of the recombination device generally includes a small opening. Although this small opening presents a resistance to flow, a portion of the gases can escape from the recombination device. Water losses occur from non-stoichiometric gasing phases which produce surplus oxygen or hydrogen that are not catalytically recombined and from water vapor carried by the escaping gases.

German patent publication DE-OS No. 28 04 583 shows the use of venting means in combination with a housing which contains a storage battery and a recombining device. The venting means is designed so that at a predetermined pressure in the housing, the vents open to permit escape or entry of gases depending on the pressure differential in respect to the outside atmosphere. Vents of this type may reduce water losses. However during extended use, the vents may not function properly due to corrosion or fatigue of the elastic materials.

In view of these problems with prior devices, it is therefore an object of the invention to provide a pressure sensitive closure for a recombination device and storage battery which will permit the use under moderate operating conditions of a gas tight enclosure in conjunction with the storage battery.

It is a further object to limit fluctuation of the gas equilibrium of a storage battery combined with a recombination device.

SUMMARY OF THE INVENTION

In accordance with the present invention, a device for catalytically recombing the discharge gases of a storage battery is presented in gas flow communication and in common gas-tight enclosure with the storage battery. The device is provided with a pressure sensitive closure employing a liquid-level seal to prevent excess pressure or vacuum within the gas-tight enclosure.

In more specific aspects of the invention, the liquid-level seal includes two vertical partially liquid-filled chambers with an overflow tube communicating between the lower portions of the two chambers. One chamber is connected at is upper portion to the interior of the gas-tight enclosure and the other chamber has an opening in its upper portion to the atmosphere.

In other aspects of the invention, the overflow tube is of inverted U-shaped with its ends positioned below the liquid level in the lower portions of the two chambers.

The invention further contemplates means for preventing propagation of explosion by providing at least five centimeters of liquid level through which gases must vent from the gas-tight enclosure.

In further aspects, an active carbon filter is included in the recombination device for absorbing metal hydrides.

BRIEF DESCRIPTION OF THE DRAWINGS

The drawing is a schematic elevation view, partly in cross section, of a gas recombination device in illustration of the present invention.

DETAILED DESCRIPTION OF THE PREFERRED EMBODIMENT

Figure 1:
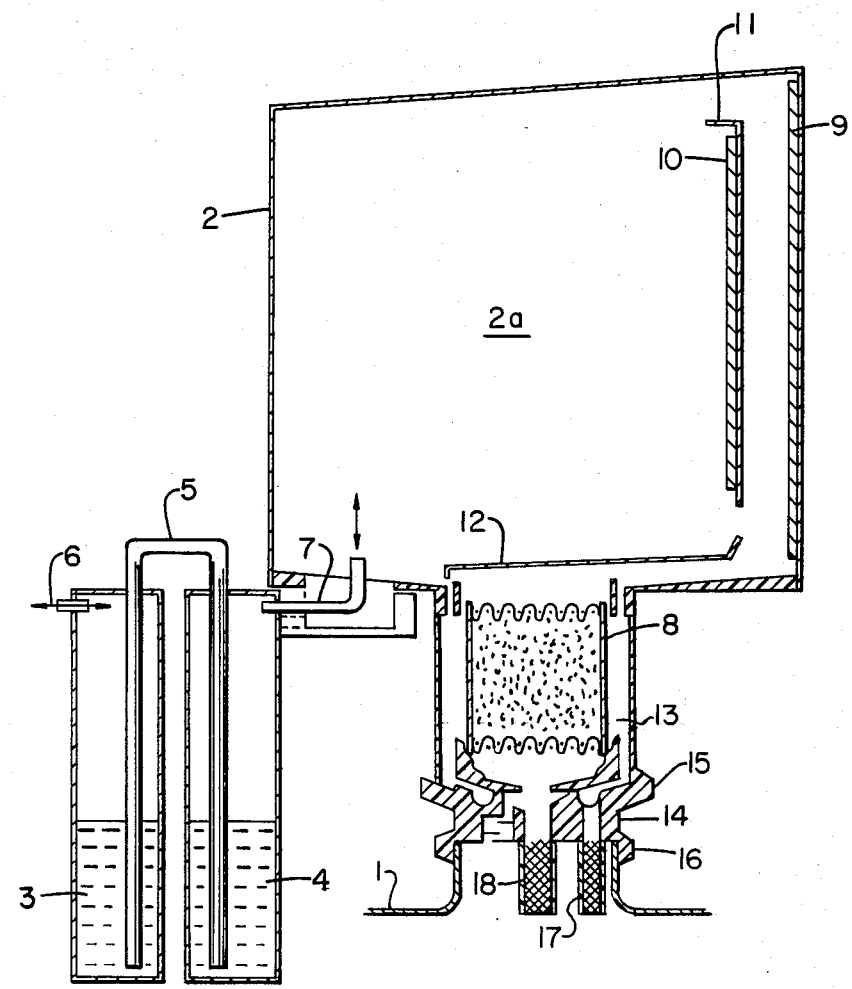

In the FIGURE, a gas recombination device 2 including a gas-tight enclosure 2a is illustrated connected to a storage battery 1. A liquid lock or seal is shown as two vertical chambers 3, 4, which are partially filled with liquid. The chambers 3 and 4 are shown to communicate through a generally U-shaped overflow tube 5 with the inverted ends extending to the bottom portion of the chambers. The first chamber is connected at its upper end portion via tube 7 to the interior of gas-tight enclosure 2a of the recombination device 2. The second chamber is connected at its upper end portion to the atmosphere outside the gas-tight enclosure. The storage battery and recombination device are shown interconnected through a filter 8 of active carbon through which the battery discharge gases flow.

Other details shown in the drawing include a supplemental recombination catalyst 10 provided with a deflection plate 11. Supplemental catalyst 10 will come into operation when the main recombination catalyst 9 is overloaded with gas flow. A gas conducting or distribution plate 12 directs the gas flow from the storage battery 1 and active carbon filter 8 into the channel formed between the main catalyst 9 and the supplemental catalyst 10. Water formed in the recombination device is returned to the battery through a return channel 13 connected to the storage battery via duct or conduit 14 and collars 15 and 16. Porous packing 17 and 18 are provided in the water return and gas flow channels.

In the operation of the gas recombination device discharge gases from storage battery 1 enter through the porous packing 18 and the active carbon filter 8 where the metal hydrides are absorbed. The gas is directed by gas distribution plate 12 into the channel formed between sheets of catalytic material 9 and 10. It is at this point that gases such as hydrogen and oxygen are recombined to form water. In instances where there is an overload of gas flow, the excess will be diverted below catalytic material 10 and above distribution plate 12 to contact the active surface of catalytic material 10. Deflection plate 11 assists in directing the excess gas flow into contact with the catalyst.

If an excess pressure occurs within the recombination device 2 it is communicated to closed chamber 4 through tubing 7. This forces the liquid from chamber 4 into chamber 3 through the overflow tube 5 until balance occurs. When the overpressure in the recombination chamber 2 is extreme, chamber 4 may be completely emptied and the resulting height of liquid in chamber 3 limits the excess pressure.

Should a vacuum occur in the recombination device 2 the liquid will be drawn from chamber 3 into chamber 4 until a balance occurs. Should the amount of vacuum become so great as to force all of the liquid from chamber 3 into chamber 4 the resulting column of liquid in chamber 4 will limit the vacuum.

During normal use of this storage battery and recombination device, the liquid lock or seal will provide a gas-tight and pressure controlled seal. Should liquid loss occur, recombination water may be used to refill either chamber 3 or 4 of the liquid seal.

Since the liquid seal will permit the escape of gases both into and out of recombination device 2 when abnormal pressure differences occur, the seal functions as a safety pressure relief or vent.

The liquid seal presented in accordance with the invention also provides protection against propagation of explosion. For this purpose, the column of liquid in the system through which escaping gas must pass should be at least 5 cm height. To further assist in this function, the overflow tube 5 has a relatively low flow resistance and is arranged so that at least one of the chambers always contains liquid.

The active carbon filter 8 is in the form of a bed of carbon particles which in combination with the liquid seal improves the security and life span of the storage battery. Poisonous gases such as stibine and arsine will be absorbed before coming into contact and poisoning the recombination catalysts.

It is therefore seen that the present invention provides a liquid seal for use with a storage battery and recombination device in a common gas-tight enclosure. For instance the two may be in a single housing or in two communicating housings. The liquid seal prevents or limits escape of hydrogen or oxygen gases generated during non-stoichiometric operation. The moisture of the wet gases likewise is retained. The device also provides a vent or pressure relief when abnormally high pressure or vacuum occurs. Since the vent gases must always pass through a column of liquid an explosion prevention function is obtained.

Although the present invention is described in terms of specific embodiments, materials, processes and techniques it will be clear to one skilled in the art that various modifications can be made in accordance with the invention as defined in the accompanying claims.

The embodiments of this invention in which an exclusive property or privilege is claimed are defined as follows:

1. A gas recombination device connected to receive gas discharge including hydrogen, oxygen and metal hydrides from a storage battery, said device comprising,
   interconnection means for gas flow between the storage battery and the recombination device;
   means for absorbing metal hydrides from the gas discharge flow communicating with the interconnection means;
   catalytic means supported within the recombination device for recombining hydrogen with oxygen gas to form water;
   a gas-tight enclosure containing the catalytic means in gas flow communicating with the storage battery; and
   a liquid level seal and pressure difference limiting means connected to the interior of the gas-tight enclosure, the seal means including a first vertical, partially liquid-filled chamber, the first chamber connected in gas flow communication with the gas-tight enclosure, a second vertical, partially liquid-filled chamber, said second chamber is open at its upper portion to the atmosphere outside the gas-tight enclosure, an inverted U-shaped overflow tube disposed with its open end portions near the bottom portions respectively of the first and of the second partially liquid-filled chambers wherein the pressure within the gas-tight enclosure is limited in respect to the outside atmospheric pressure by the level of liquid in said chambers.

2. The recombination device of claim 1 wherein the means for absorbing metal hydrides includes an active carbon filter.

3. The recombination device of claim 1 wherein the level of liquid columns in the first and second chambers is at least 5 centimeters height.

4. A gas recombination device for receiving hydrogen, oxygen and metal hydrides in gas flow from a storage battery comprising:
   a gas tight enclosure;
   catalytic means within said enclosure for combining hydrogen and oxygen gases to form water;
   interconnection means connected between the storage battery and gas tight enclosure for gas flow to the catalytic means and liquid water return to the storage battery, the interconnection means including an axially disposed active carbon filter for absorbing metal hydrides and an annular water return channel coaxial with but separated from the active carbon filter; and
   a liquid level seal for limiting pressure difference between the interior and exterior of the gas-tight enclosure connected to the gas tight enclosure at a location separate from that of the interconnection means to the storage battery, the liquid level seal comprises a first vertical, partially liquid-filled chamber, said first chamber connected in gas flow communication with the gas-tight enclosure, a second vertical, partially liquid-filled chamber, said second chamber is open at its upper portion to the atmosphere outside the gas-tight enclosure, an inverted U-shaped tube disposed with its open end portions near the bottom portions respectively of the first and of the second partially liquid-filled chambers wherein the pressure within the gas-tight enclosure is limited in respect to the outside pressure by the level of liquid in said chambers.

5. The gas recombination device of claim 4 wherein the level of liquid columns in the first and second chambers is at least 5 centimeters height.

* * * * *